United States Patent
Horii et al.

(10) Patent No.: US 8,056,658 B2
(45) Date of Patent: Nov. 15, 2011

(54) SADDLE SEAT TYPE ELECTRIC VEHICLE

(75) Inventors: Yoshiyuki Horii, Saitama (JP); Jun Morimoto, Saitama (JP); Koji Aoki, Saitama (JP); Takashi Sone, Saitama (JP); Atsushi Otsu, Saitama (JP); Satoshi Honda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 12/174,953

(22) Filed: Jul. 17, 2008

(65) Prior Publication Data

US 2009/0020348 A1 Jan. 22, 2009

(30) Foreign Application Priority Data

Jul. 20, 2007 (JP) ................................. 2007-189952

(51) Int. Cl.
*B60K 1/00* (2006.01)
(52) U.S. Cl. ....................................... 180/65.1; 180/68.5
(58) Field of Classification Search .................. 180/65.1
See application file for complete search history.

(56) References Cited

U.S. PATENT DOCUMENTS

| | | | | |
|---|---|---|---|---|
| 4,582,158 A * | 4/1986 | Hamane | ...................... | 180/229 |
| 5,489,002 A * | 2/1996 | Streiff | ...................... | 180/65.31 |
| 6,158,542 A * | 12/2000 | Nolet | ........................... | 180/206 |
| 6,655,483 B2 * | 12/2003 | Hayashi | ..................... | 180/65.1 |
| 7,117,966 B2 * | 10/2006 | Kohda et al. | ................ | 180/68.5 |
| 7,261,172 B2 * | 8/2007 | Tsukada et al. | ............ | 180/68.1 |
| 7,455,136 B2 * | 11/2008 | Pleune et al. | ............... | 180/68.1 |
| 2002/0162693 A1 * | 11/2002 | Mizuno et al. | .............. | 180/65.1 |

FOREIGN PATENT DOCUMENTS

JP 2005-104243 A 4/2005

\* cited by examiner

*Primary Examiner* — Jeffrey J Restifo
*Assistant Examiner* — Erez Gurari
(74) *Attorney, Agent, or Firm* — Birch, Stewart, Kolasch & Birch, LLP

(57) ABSTRACT

A saddle seat type fuel-cell electric vehicle includes a motor for driving rear wheels, a secondary battery for supplying electric power to the motor, a carrier for carrying luggage and a seat for supporting an operator, the carrier is located behind the seat and above the rear wheels. The secondary battery includes a plurality of cells each having an elongated boxlike shape, and it is stored in the internal space of the carrier, thereby increasing the flexibility of the layout of the vehicle body. Spacings functioning as air passages are defined between the inner wall of the carrier and the secondary battery. The carrier is formed with air inlet openings for introducing an air flow into the internal space and an air outlet opening for discharging the air flow out of the internal space. The plural cells are arranged adjacent to each other with given intervals on the same plane.

9 Claims, 7 Drawing Sheets

SADDLE SEAT TYPE ELECTRIC VEHICLE

CROSS-REFERENCE TO RELATED APPLICATIONS

The present application claims priority under 35 USC 119 to Japanese Patent Application No. 2007-189952 filed on Jul. 20, 2007 the entire contents of which are hereby incorporated by reference.

BACKGROUND OF THE INVENTION

1. Field of the Invention

The present invention relates to a saddle seat type electric vehicle. More particularly, to a saddle seat type electric vehicle which can increase the flexibility of layout of a vehicle body, can support an increase in the size of a secondary battery, and can efficiently cool the secondary battery by improving an installation method for the secondary battery.

2. Description of Background Art

A saddle seat type electric vehicle is known that uses an electric motor as a driving source. In a saddle seat type vehicle with little empty space unlike a four-wheeled vehicle having a compartment, the presence of a secondary battery for storing electric power to be supplied to a motor has a large effect on the layout of a vehicle body. Accordingly, various improvements in installation methods for the secondary battery have been made in the prior art.

Japanese Patent Laid-open No. 2005-104243 discloses a scooter type hybrid vehicle using an internal combustion engine and an electric motor in combination, wherein a luggage storing space is provided below a seat for an operator and a platelike secondary battery is provided on each side of the luggage storing space in the lateral direction of the vehicle so as to cover this space.

According to the layout structure disclosed in Japanese Patent Laid-open No. 2005-104243, the luggage storing space can be made wide. On the other hand, the secondary battery mounted on an electric vehicle tends to be increased in size in order to meet the requirement for increasing mileage. Further, in the case of increasing the size of the secondary battery, it is necessary to efficiently dissipate the heat generated in recharging and discharging the secondary battery.

SUMMARY AND OBJECTS OF THE INVENTION

It is accordingly an object of the present invention to provide a saddle seat type electric vehicle which can increase the flexibility of the layout of a vehicle body, can support an increase in size of a secondary battery, and can efficiently cool the secondary battery by improving the installation method for the secondary battery.

In accordance with an embodiment of the present invention, there is provided a saddle seat type electric vehicle including a drive wheel, a motor for driving the drive wheel, a secondary battery for supplying electric power to the motor, a carrier for carrying luggage, and a seat for supporting an operator, wherein the carrier is formed like a box having an internal space and is located behind the seat and above a rear wheel. The secondary battery is stored in the internal space of the carrier.

In accordance with an embodiment of the present invention, the secondary battery includes a plurality of cells.

In accordance with an embodiment of the present invention, the carrier has an air inlet opening for introducing an air flow into the internal space, so as to cool the secondary battery and an air outlet opening for discharging the air flow out of the internal space.

In accordance with an embodiment of the present invention, the plurality of cells are arranged adjacent to each other with given intervals on the same plane.

In accordance with an embodiment of the present invention, the saddle seat type electric vehicle further includes a protective member provided between the secondary battery and an inner wall of the carrier and fixed to the carrier so as to surround the secondary battery.

According to an embodiment of the present invention, the carrier is formed like a box having an internal space and is located behind the seat and above the rear wheel, and the secondary battery is stored in the internal space of the carrier. Accordingly, it is not necessary to ensure an installation space for the secondary battery on the vehicle body, so that the flexibility of layout of the vehicle body can be increased. Further, the secondary battery can be utilized as a structural member of the carrier, thereby increasing the strength of the carrier owing to the rigidity of the secondary battery.

According to an embodiment of the present invention, the secondary battery includes a plurality of cells. Accordingly, the secondary battery can be stored according to the shape of the internal space of the carrier, so that the flexibility of design of the carrier can be increased.

According to an embodiment of the present invention, the carrier has an air inlet opening for introducing an air flow into the internal space, so as to cool the secondary battery and an air outlet opening for discharging the air flow out of the internal space. Accordingly, the secondary battery stored in the internal space of the carrier can be positively exposed to the air flow introduced into the internal space of the carrier, thereby enhancing the cooling effect to the secondary battery.

According to an embodiment of the present invention, the plural cells are arranged adjacent to each other with given intervals on the same plane. Accordingly, even though the plural cells are arranged, heat radiation from the upper and lower surfaces of each cell is not hindered, thereby enhancing the cooling effect to the secondary battery.

According to an embodiment of the present invention, a protective member is provided between the secondary battery and the inner wall of the carrier and fixed to the carrier so as to surround the secondary battery. Accordingly, the secondary battery can be stably fixed to the carrier. In addition, the secondary battery can be protected from an external force by the protective member. Thus, the protective member has a first function of stably fixing the secondary battery to the carrier and a second function of protecting the secondary battery from an external force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
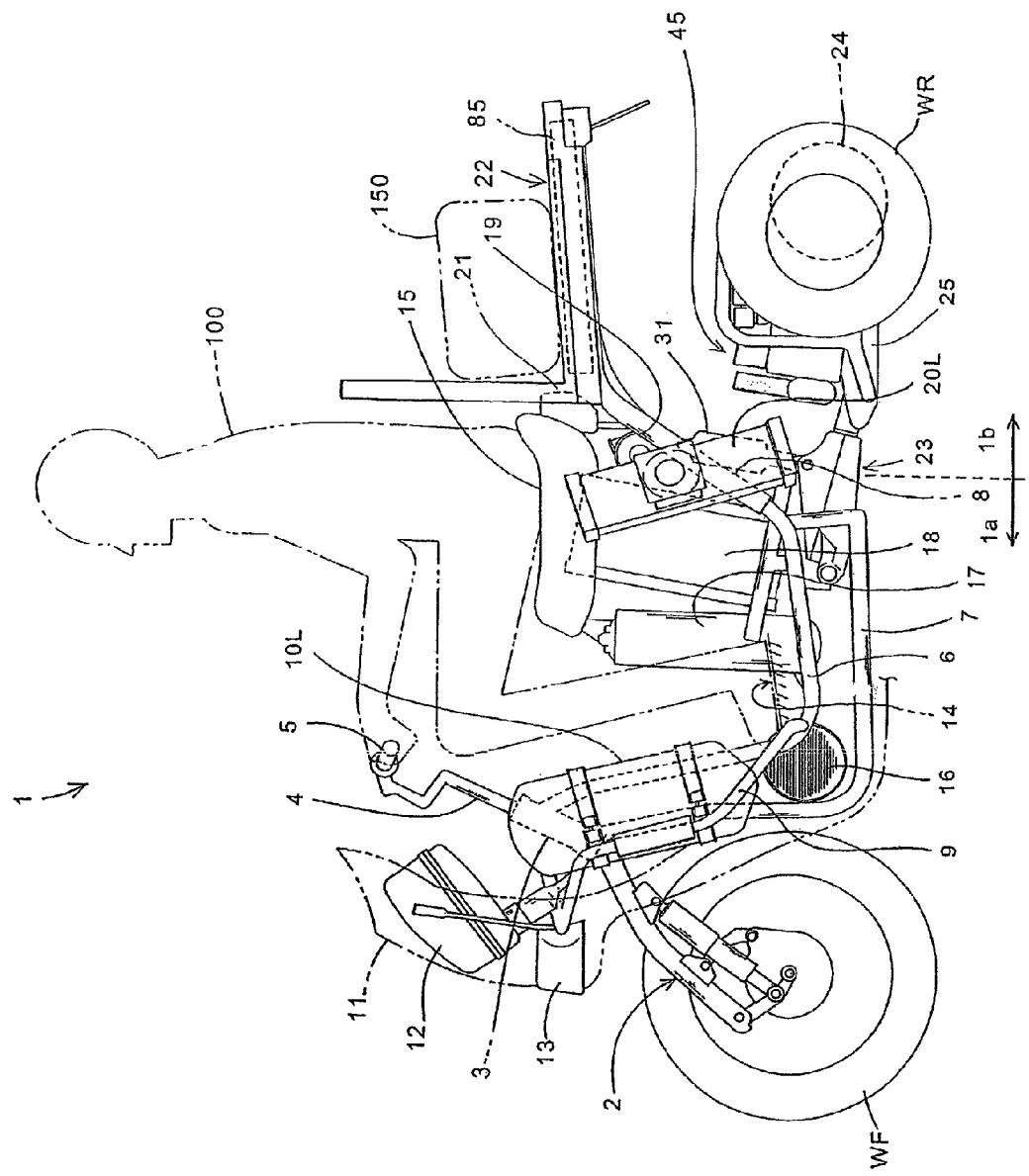
FIG. 1 is a left side view of a saddle seat type fuel-cell electric vehicle according to a preferred embodiment of the present invention.
Figure 2:
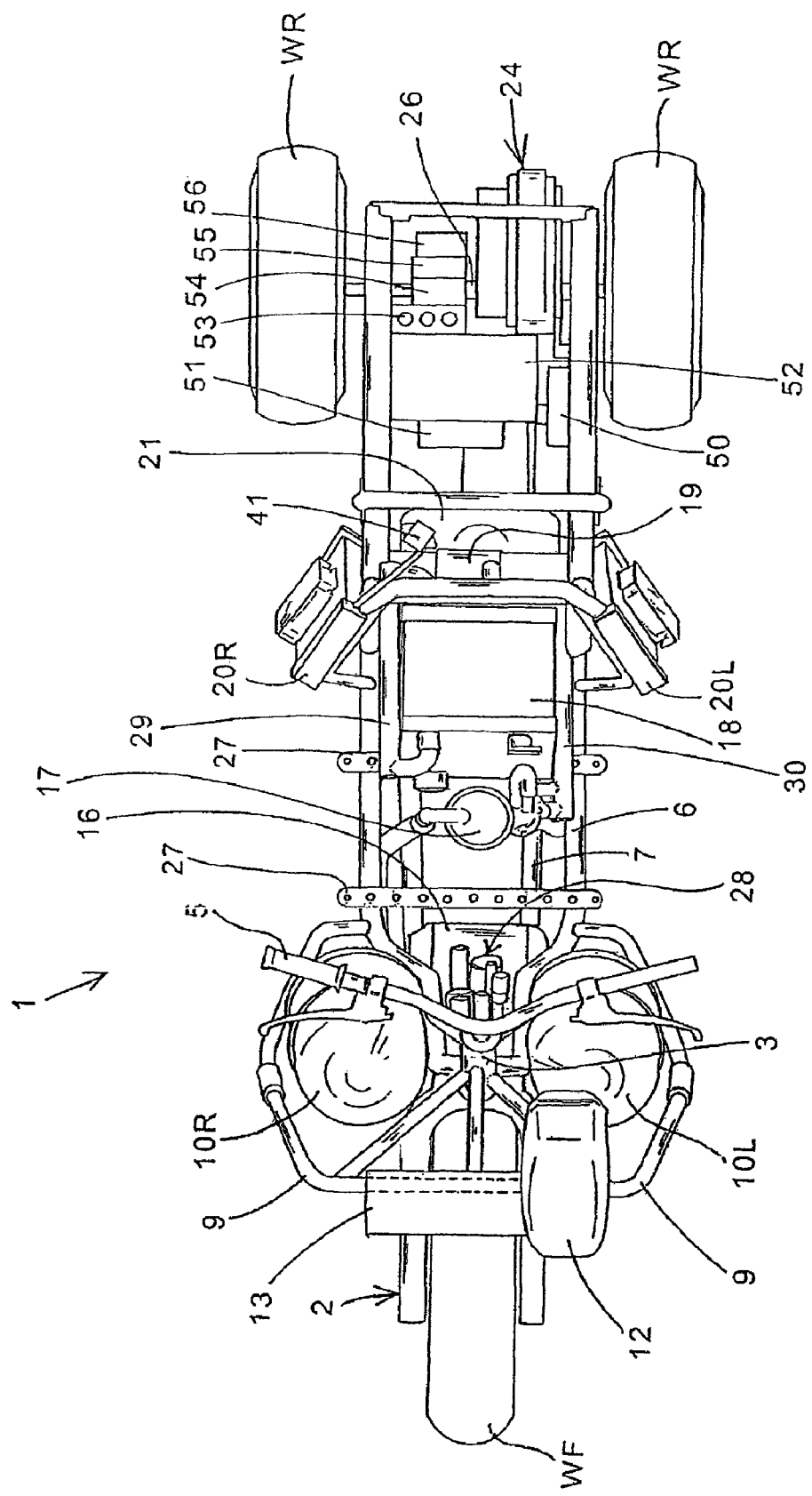
FIG. 2 is a top plan view of the fuel-cell electric vehicle shown in FIG. 1.

A preferred embodiment of the present invention will now be described in detail with reference to the drawings. FIG. 1 is a left side view of a saddle seat type fuel-cell electric vehicle 1 according to a preferred embodiment of the present invention and FIG. 2 is a top plan view of the fuel-cell electric vehicle 1 shown in FIG. 1. The fuel-cell electric vehicle 1 is a three-wheeled electric vehicle having one front wheel WF as a steered wheel and two rear wheels WR spaced apart from each other in the lateral direction of the vehicle so as to be driven by a motor. The fuel-cell electric vehicle 1 has a scooter type vehicle body configuration such that a low floor type footrest is provided between a steering handle and an operator's seat. Further, the fuel-cell electric vehicle 1 has a fuel-cell electric power generation system including a cell stack formed by stacking a plurality of cells to configure a fuel cell, a fuel (hydrogen) gas supply system for supplying hydrogen gas as a fuel to the cell stack, and a reactant gas supply system for supplying a reactant gas (air) containing oxygen to the cell stack. The motor is driven by electric power generated by the fuel cell or by electric power supplied from a secondary battery for storing the electric power generated by the fuel cell, thereby operating the vehicle 1.

A head pipe 3 is provided at the front end of a body frame, and a steering stem 4 for supporting a bottom link type front suspension 2 is rotatably supported on the head pipe 3. A front wheel WF as a steered wheel is rotatably supported on the lower end portion of the front suspension 2. The front wheel WF can be steered by a steering handle 5 connected to the steering stem 4. A pair of right and left main frames 6 are connected at their front ends to the head pipe 3 and have such a shape that they extend substantially vertically downwardly from the head pipe 3 and are bent at their lower ends to extend substantially horizontally rearward. A pair of right and left under frames 7 having a shape similar to that of the main frames 6 are provided below the main frames 6. That is, as similar to the main frames 6, each of the right and left under frames 7 has a vertical portion connected to the head pipe 3 that extend substantially vertically downward therefrom and a horizontal portion that extends substantially horizontally rearward from the lower end of the vertical portion. The rear end portions of the right and left under frames 7 are bent to extend substantially vertically upward and are connected to the right and left main frames 6, respectively. The rear end portions of the right and left main frames 6 behind the connected portions of the under frames 7 to the main frames 6 are connected to a pair of right and left rear frames 8, respectively. A carrier 22 is supported by the right and left rear frames 8. A secondary battery 85 for storing the electric power generated by a fuel cell 18 is contained in the carrier 22.

The fuel cell 18 has a substantially rectangular parallelepiped shape. The fuel cell 18 is located below a seat 15 for supporting an operator 100 in such a manner as to be inclined to the rear side of the vehicle at a predetermined angle (e.g., 30 degrees). A pair of right and left radiators 20R and 20L for cooling the fuel cell 18 are provided adjacent to the fuel cell 18 on the right and left sides thereof in the lateral direction of the vehicle. A motor-driven pump 19 as an actuator for feeding a cooling water to the radiators 20R and 20L is provided on the rear side of the fuel cell 18. Further, a humidifier 17 for humidifying the reactant gas to be supplied to the fuel cell 18 is provided on the front side of the fuel cell 18. The humidifier 17 has a substantially cylindrical shape. The humidifier 17 is located below the seat 15 at a central position in the lateral direction of the vehicle.

A low floor type footrest 14 is provided below the seat 15 and the steering handle 5. The footrest 14 has a flat floor formed from a resin plate on which the feet of the operator 100 are supported during operation of the vehicle. In this preferred embodiment, the footrest 14 has a laterally symmetrical shape as viewed in plan. A pair of front and rear stays 27 for supporting the resin plate of the footrest 14 are mounted on the upper surfaces of the right and left main frames 6 at such positions that the humidifier 17 is interposed between the stays 27 in the longitudinal direction of the vehicle. Further, a supercharger 16 as an actuator for feeding the reactant gas to the fuel cell 18 is provided on the front lower side of the footrest 14 in a space surrounded by the main frames 6 and the under frames 7.

The vehicle body of the fuel-cell electric vehicle 1 is composed of a front vehicle body 1a and a rear vehicle body 1b connected to the front vehicle body 1a. The front vehicle body 1a includes the body frame and the front wheel WF, wherein the body frame includes the right and left main frames 6 and the right and left under frames 7. The rear vehicle body 1b includes the rear wheels WR. The front vehicle body 1a and the rear vehicle body 1b are connected by a connecting mechanism 23. A shock absorber 31 for absorbing a vertical shock is mounted both to a part of the connecting mechanism 23 and to a mounting frame 43 (see FIG. 3) provided between the right and left rear frames 8. A Neidhart swing mechanism using a rubber damper is adopted as the connecting mechanism 23, thereby allowing the vehicle to turn in the condition where the front vehicle body 1a is inclined to the right or left side of the vehicle with the two rear wheels WR maintained in contact with a road surface. A power unit 24 including a driving motor and a speed reduction mechanism in an integral manner is provided between the right and left rear wheels WR on the rear side of a base member 25 of the rear vehicle body 1b. The rear wheels WR are driven by the driving motor in the power unit 24. A driving force output from the power unit 24 is transmitted through an axle 26 to the rear wheels WR. A plurality of drive line electrical parts 45 such as motor control units are mounted on the base member 25 between the rear wheels WR. These drive line electrical parts 45 are substantially boxlike parts having different sizes, and include a motor driver 50 as a motor control unit for controlling the driving motor, a DC-DC converter 51 for converting a DC voltage to a predetermined value, a voltage converter (VCU) 52 for increasing or decreasing a supplied voltage from the fuel cell 18, a main CPU 53 as a motor control unit, a control driver 54 for driving the supercharger 16, a control driver 55 for driving the motor-driven pump 19, and a fuse box 56 for containing a plurality of fuses.

A pair of right and left hydrogen cylinders 10R and 10L as fuel tanks are provided on the right and left sides of the head pipe 3 in the lateral direction of the vehicle so as to interpose the main frames 6 and the under frames 7. In other words, the right hydrogen cylinder 10R is provided on the right side of the right main frame 6 and the right under frame 7, and the left hydrogen cylinder 10L is provided on the left side of the left main frame 6 and the left under frame 7. The hydrogen cylinders 10R and 10L are surrounded on their front side and right and left sides by a guard pipe 9 connected to the main frames 6. In other words, the guard pipe 9 is composed of a front portion for covering the front side of the hydrogen cylinders 10R and 10L and a pair of right and left portions connected to the opposite ends of the front portion for covering the right and left sides of the hydrogen cylinders 10R and 10L. An air cleaner box 12 for filtering the outside air as the reactant gas is provided on the front upper side of the left hydrogen cylinder 10L. The front side of the vehicle is covered with a cowling 11 as an exterior component formed from a thin resin plate or the like. A protective pad 13 is mounted on the front portion of the guard pipe 9. The protective pad 13 is partially exposed to an opening formed through the cowling 11.

The right and left radiators 20R and 20L are inclined downward to the front side of the vehicle as viewed in a side elevation, and the inside flat surfaces of the right and left radiators 20R and 20L for receiving the air flow are inclined inward in the lateral direction of the vehicle as viewed in plan, so as to easily receive the flow of air from the front side of the vehicle. A reserve tank 21 for the cooling water is provided on the rear upper side of the fuel cell 18, and a hydrogen sensor 41 is provided on the upper side of the reserve tank 21.

A hydrogen supply unit 28 including a control unit for controlling the amount of hydrogen gas to be supplied to the fuel cell 18 and the like is provided between the right and left hydrogen cylinders 10R and 10L in a space surrounded by the right and left main frames 6 and the right and left under frames 7. An intake manifold 29 and an exhaust manifold 30 are mounted to the fuel cell 18. The intake manifold 29 functions to supply the reactant gas humidified by the humidifier 17 to the fuel cell 18 at its upper portion. The exhaust manifold 30 functions to exhaust unreacted gases remaining in the fuel cell 18 after the chemical reaction from the lower portion of the fuel cell 18.

Figure 3:
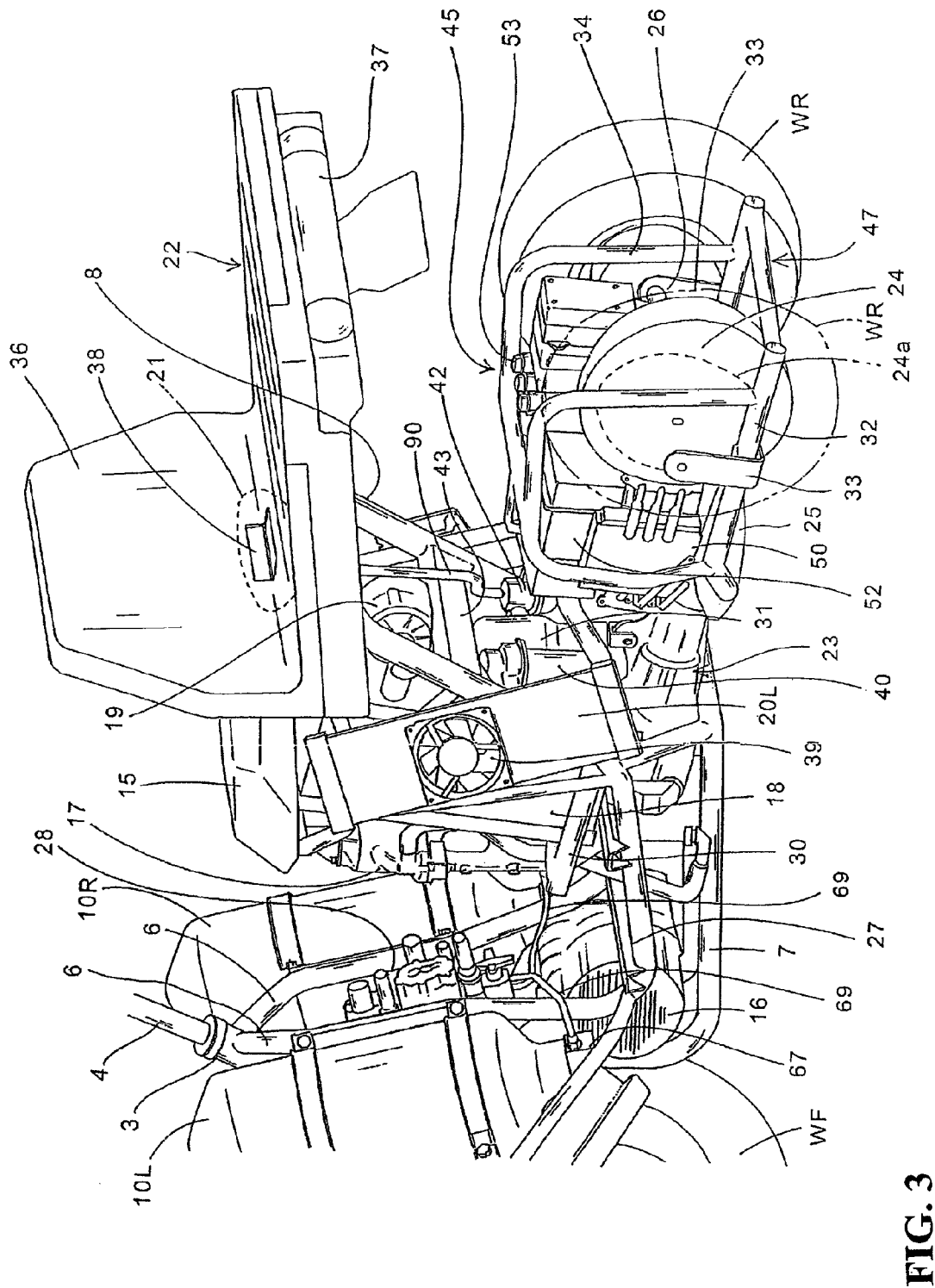
FIG. 3 is a perspective view of the fuel-cell electric vehicle as viewed from the left rear side thereof.

FIG. 3 is a perspective view of the fuel-cell electric vehicle 1 as viewed from the left rear side thereof. In FIG. 3, the left rear wheel WR is not shown for the convenience of illustration. The same reference numerals as those in FIGS. 1 and 2 denote the same or like parts. A blocklike plug member 67 is mounted to the lower end of each of the right and left hydrogen cylinders 10R and 10L. A hydrogen gas supply pipe 69 is connected to each plug member 67 to supply the hydrogen gas to the hydrogen supply unit 28. The hydrogen supply unit 28 is located between the right and left hydrogen cylinders 10R and 10L and between the right and left main frames 6 in the lateral direction of the vehicle, and is opposed to the humidifier 17 with the footrest 14 interposed therebetween in the longitudinal direction of the vehicle. The radiators 20R and 20L are located on the right and left sides of the fuel cell 18, and each of the radiators 20R and 20L is provided with a motor-driven fan 39 capable of forcibly causing a flow of air for heat radiation even in the rest condition of the vehicle.

An ion exchanger 40 for removing predetermined ions from the cooling water to suppress the electric conductivity of the cooling water is provided below the motor-driven pump 19 located behind the fuel cell 18. Further, the shock absorber 31 connected between the connecting mechanism 23 and the mounting frame 43 is also provided below the motor-driven pump 19. Further, a thermostat 42 for the cooling water is also provided below the motor-driven pump 19. The thermostat 42 functions to change a cooling water path according to the temperature of the cooling water to thereby prevent supercooling of the fuel cell 18. An air bleed pipe 90 for removing air or the like mixed in the cooling water to introduce it into the reserve tank 21 is connected to the upper portion of the thermostat 42.

The carrier 22 supported to the right and left rear frames 8 is composed of a substantially horizontal flat floor for carrying luggage 150 (see FIG. 1) and a substantially vertical rising portion 36 rising from the front end of the flat floor for fixing the luggage 150 placed on the front portion of the flat floor. An opening 38 is formed through the lower end portion of the rising portion 36 at a laterally central position thereof, so as to allow the visual check of a part of the reserve tank 21. Accordingly, the operator can visually check the amount of the cooling water remaining in the reserve tank 21 through the opening 38. The rising portion 36 may be used as a backrest for the operator 100. A tail lamp unit 37 including a brake lamp and turn signal lamps in combination is mounted at the rear end portion of the carrier 22.

A lower frame 47 is connected to the base member 25 of the rear vehicle body 1b connected through the connecting mechanism 23 to the front vehicle body 1a. The lower frame 47 includes a base frame 32 forming a main frame and a subframe 34 provided on the upper side of the base frame 32 for increasing the rigidity of the base frame 32. The subframe 34 has a shape so as to surround the drive line electrical parts 45 mounted on the base member 25, thereby functioning as a protective member for protecting the drive line electrical parts 45 from an external force. Thus, the drive line electrical parts 45 including the power unit 24 having a driving motor 24a, the motor driver 50 as a motor control unit for controlling the driving motor 24a, and the voltage converter (VCU) 52 for increasing or decreasing the supplied voltage from the fuel cell 18 are collectively arranged in the space surrounded by the base frame 32 and the subframe 34. A pair of right and left axle holders 33 for supporting the axle 26 for the rear wheels WR are mounted on the base frame 32.

Figure 4:
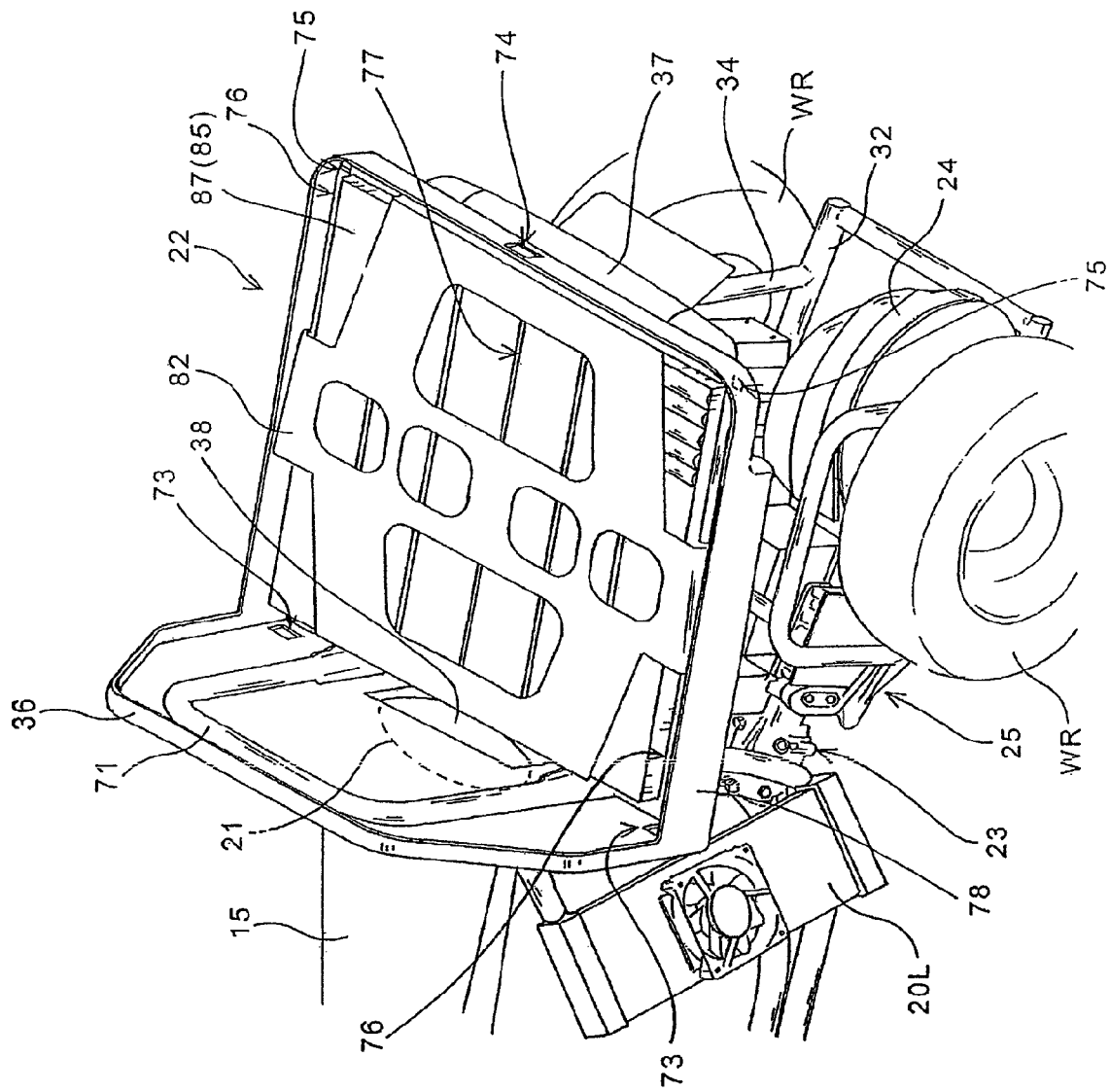
FIG. 4 is a perspective view showing the internal space of a carrier.
Figure 5:
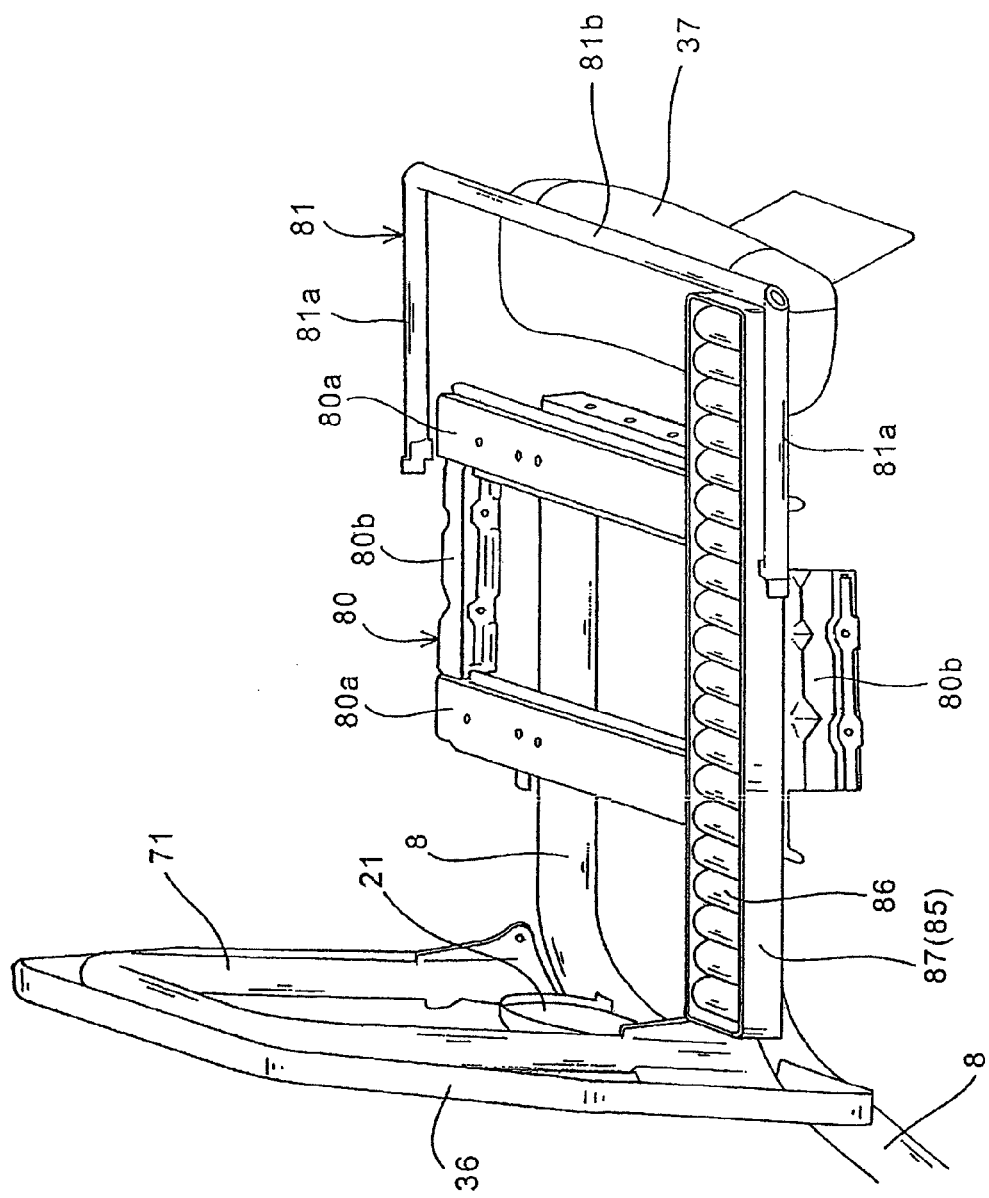
FIG. 5 is a perspective view showing the layout structure of a secondary battery.
Figure 7A:
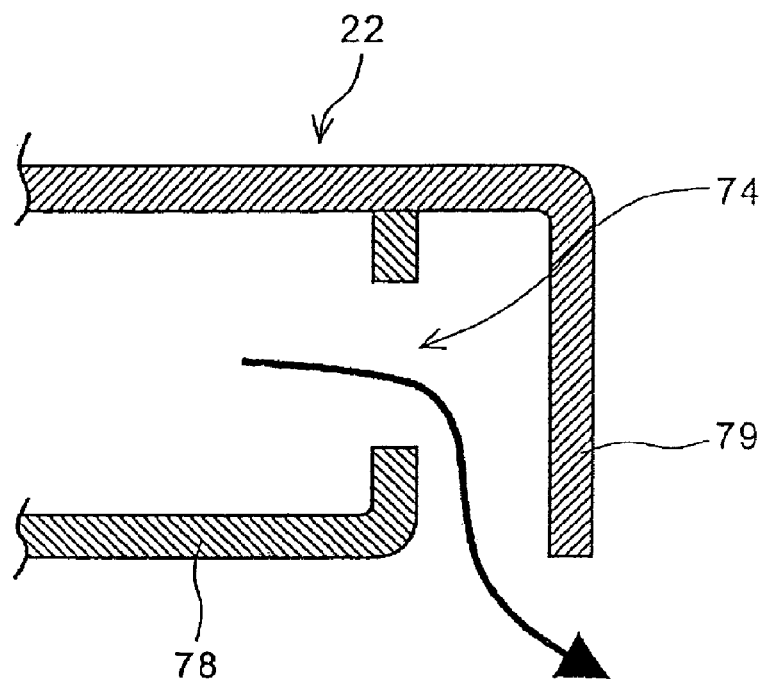
FIGS. 7(a) and 7(b) are enlarged sectional views of essential parts of the carrier.
Figure 7B:
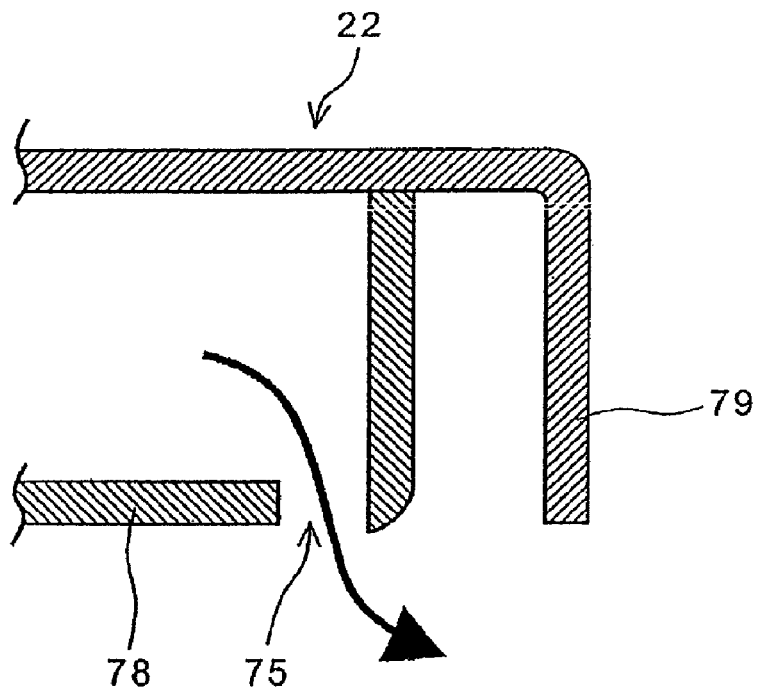

FIG. 4 is a perspective view showing the internal structure of the carrier 22, and FIG. 5 is a perspective view showing the layout structure of the secondary battery 85. Further, FIGS. 7(a) and 7(b) are enlarged sectional views of essential parts of the carrier 22. In FIGS. 4, 5, 7(a), and 7(b) the same reference numerals as those in FIGS. 1 to 3 denote the same or like parts. The carrier 22 is formed like a flattened box by using a thin plate member of resin or the like, so as to ensure an internal space for storing the secondary battery 85. In FIG. 4, a top plate 79 (see FIGS. 7(a) and 7(b)) for carrying luggage is not shown for the convenience of illustration. In this preferred embodiment, the secondary battery 85 is composed of six cells 87 connected to each other, each cell 87 containing a plurality of cell elements 86. Each cell 87 is composed of an elongated boxlike outer shell formed from a thin plate of resin or the like and the plural cell elements 86 closely packed in the outer shell, thereby functioning as a rigid structural member. The six cells 87 are arranged adjacent to each other in the lateral direction of the vehicle on the same plane, and each cell 87 extends in the longitudinal direction of the vehicle.

The lower portion of the carrier 22 is formed by a bottom plate 78, and two air inlet openings 73 for introducing an air flow into the internal space of the carrier 22 are formed at the front end of the bottom plate 78. The two air inlet openings 73 are located at right and left end positions spaced apart from the central position in the lateral direction of the vehicle, thereby allowing a smooth introduction of the air flow into the internal space of the carrier 22 without the interference of any obstacle. Further, the opening 38 for allowing the visual check of the amount of the cooling water in the reserve tank 21 is formed at the laterally central position of the rising portion 36, so that the opening 38 communicates with the internal space of the carrier 22 to allow the introduction of the air flow into the internal space of the carrier 22. Further, a spacing 76 is defined between the left side wall of the bottom plate 78 of the carrier 22 and the left side surface of the leftmost cell 87. Similarly, another spacing 76 is defined between the right side wall of the bottom plate 78 and the right side surface of the rightmost cell 87. The spacings 76 function as air passages for allowing the passing of the air flow introduced into the internal space of the carrier 22. Further, a spacing 77 functioning as an air passage is also defined between any adjacent ones of the cells 87. Further, an air outlet opening 74 for discharging the air flow out of the internal space of the carrier 22 is formed at the rear end of the bottom plate 78. The air outlet opening 74 is located at the laterally central position of the bottom plate 78. Further, two drain openings 75 for removing water or the like out of the internal space of the carrier 22 are formed through the lower wall portion of the bottom plate 78 at the right and left end positions thereof.

FIG. 7(a) is an enlarged sectional view of the rear end portion of the carrier 22 for illustrating the shape of the air outlet opening 74, and FIG. 7(b) is an enlarged sectional view of the rear end portion of the carrier 22 for illustrating the shape of each drain opening 75. The top plate 79 of the carrier 22 has such a shape that it is bent downward at its rear end portion to cover the rear end portion of the bottom plate 78. With this structure, the air outlet opening 74 and each drain opening 75 can be protected from the turbulence in the vicinity of the carrier 22 due to the air flow or from the entry of water or the like. With the structure of the carrier 22 as mentioned above, the air flow produced during the operation of the vehicle is introduced from the air inlet openings 73 and the opening 38 into the internal space of the carrier 22, next is passed through the spacings 76 between the bottom plate 78 and the cells 87 and through the spacings 77 between the cells 87, and finally is discharged from the air outlet opening 74 and the drain openings 75. Accordingly, the air flow can be passed along the opposite side surfaces of each cell 87, thereby enhancing the cooling effect to the secondary battery 85. Various modifications may be made on the number or position of the air inlet openings 73, the air outlet opening 74, and the drain openings 75. For example, the air inlet openings 73 may be formed through the front wall of the rising portion 36 communicating with the internal space of the carrier 22. Further, other spacings for allowing the passing of the air flow may be further defined on the upper and lower sides of the secondary battery 85.

While the plural cells 87 are arranged on the same plane in this preferred embodiment, they may be vertically arranged with given intervals or may be arranged linearly in the longitudinal direction of the vehicle with given internals. Further, the shape of the carrier 22 may be arbitrarily changed according to the size and layout of each cell 87. An invertedly U-shaped support frame 71 connecting the right and left rear frames 8 is provided in the internal space of the rising portion 36, thereby supporting the rising portion 36.

The cells 87 (the secondary battery 85) accommodated in the carrier 22 are surrounded by a protective plate 82 and a mounting base 80 as protective members. The protective plate 82 for covering the upper side of the cells 87 is mounted on the mounting base 80. The mounting base 80 is fixed to the upper surfaces of the right and left rear frames 8. The mounting base 80 is composed of two base plates 80a extending in the lateral direction of the vehicle and two connecting members 80b for connecting the base plates 80a. The bottom plate 78 of the carrier 22 is mounted on the base plate 80a. The protective plate 82 is fastened to the connecting members 80b by screws or the like. Accordingly, the protective plate 82 is connected through the base plates 80a to the carrier 22 and the rear frames 8.

With this structure, the protective members are provided between the secondary battery 85 and the inner wall of the carrier 22. Accordingly, the protective members, or the mounting base 80 and the protective plate 82 have a first function of stably fixing the secondary battery 85 to the carrier 22 and a second function of protecting the secondary battery 85 from an external force.

A protective pipe 81 as another protective member is provided so as to surround the rear portion of the secondary battery 85. The protective pipe 81 is mounted on the bottom plate 78 of the carrier 22. The protective pipe 81 is composed of a pair of right and left side pipes 81a extending along the right and left side surfaces of the secondary battery 85 at its rear portion and a connecting pipe 81b for connecting the rear ends of the right and left side pipes 81a. The protective pipe 81 is interposed between the carrier 22 and the secondary battery 85 to thereby protect the rear portion of the secondary battery 85. The protective pipe 81 may also function to support the tail lamp unit 37. Further, the number of the cell elements 86 and the cells 87 constituting the secondary battery 85 is not limited. For example, a plurality of secondary batteries having different output voltages may be provided in the internal space of the carrier 22.

Figure 6:
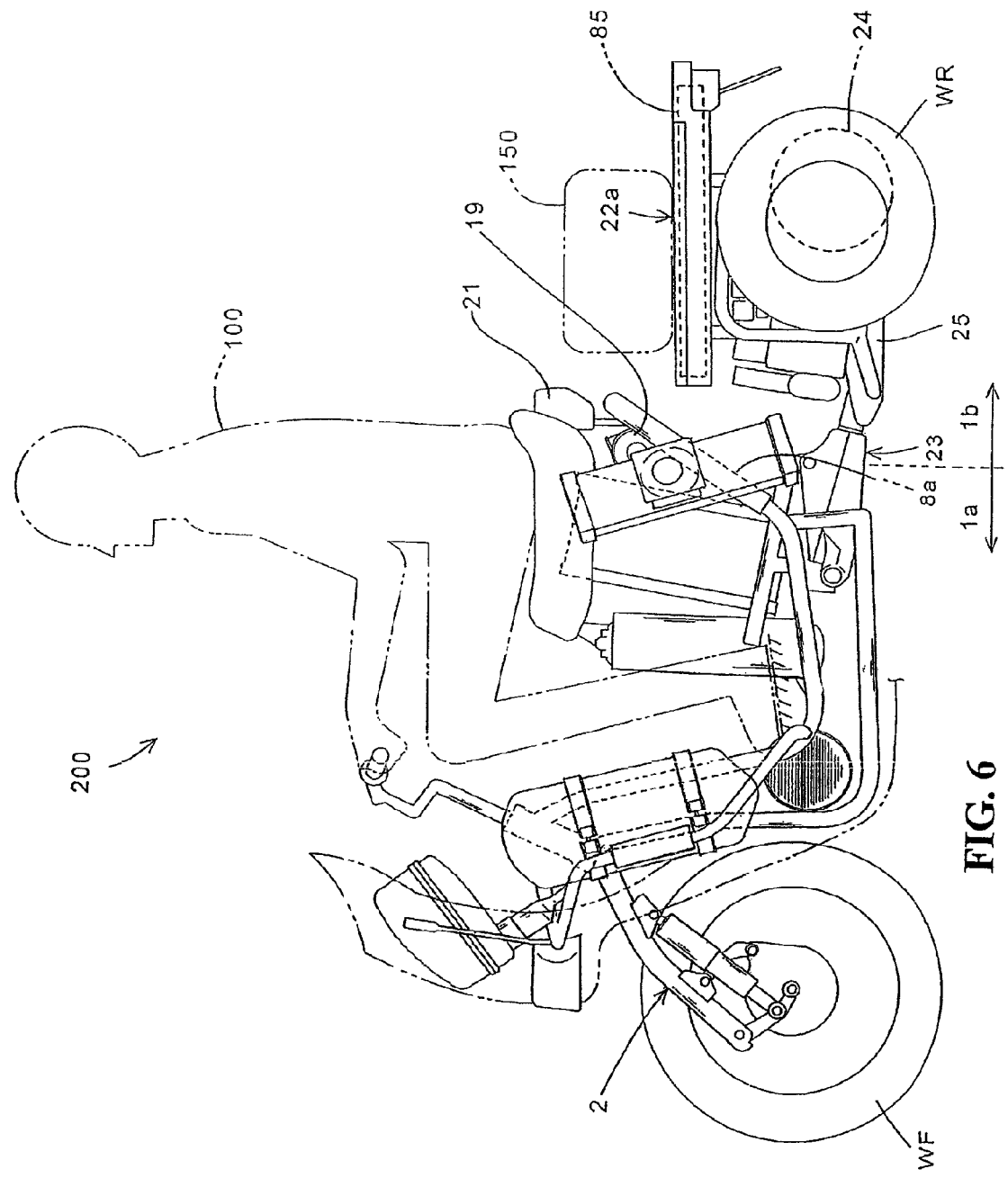
FIG. 6 is a left side view of a saddle seat type fuel-cell electric vehicle according to a modification of the preferred embodiment.

FIG. 6 is a side view of a saddle seat type fuel-cell electric vehicle 200 according to a modification of the above preferred embodiment of the present invention, in which the same reference numerals as those in FIGS. 1 to 5 denote the same or like parts. The fuel-cell electric vehicle 200 is different from the fuel-cell electric vehicle 1 in only the configuration of the carrier 22. More specifically, the fuel-cell electric vehicle 200 includes a carrier 22a for storing a secondary battery 85, wherein the carrier 22a is mounted directly to the upper portion of a rear vehicle body 1b. Since the secondary battery 85 is mounted directly to the rear vehicle body 1b, the secondary battery 85 can be protected from oscillations about the longitudinal axis of the vehicle. Various modifications may be made on the shape of the carrier 22a. For example, the carrier 22a may have a rising portion for supporting the front end of the luggage.

According to the saddle seat type electric vehicle of the present invention, the secondary battery is stored in the internal space of the carrier. Accordingly, it is not necessary to ensure an installation space for the secondary battery on the vehicle body, so that the flexibility of the layout of the vehicle body can be increased. Further, the secondary battery can be utilized as a structural member of the carrier, thereby increasing the strength of the carrier.

Various modifications may be made on the shape of the carrier, secondary battery, and protective members. For example, the secondary battery may be provided not only in the internal space of the carrier, but also in any other space. Further, the saddle seat type electric vehicle may be a vehicle using only a secondary battery as an electric power source for a driving motor. Further, the saddle seat type electric vehicle may be a two-wheeled vehicle or a four-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle seat type electric vehicle comprising:
a drive wheel;
a motor for driving said drive wheel;
a secondary battery including a plurality of cells for supplying electric power to said motor;
a carrier for carrying luggage;
a seat for supporting an operator;
a radiator located on a side of said vehicle inclined downward to a front side of said vehicle for receiving air flow; and
a motor-driven fan mounted on said radiator capable of forcibly causing a flow of air,
wherein said carrier is formed like a box having an internal space and is located behind said seat and above a rear wheel,
said plurality of cells of the secondary battery is stored in said internal space of said carrier, and
said carrier has a drain opening for removing water from said carrier, and said carrier includes an air inlet opening for introducing an air flow into said internal space with at least one spacing formed between the plurality of cells of the secondary battery, so as to cool said secondary battery and an air outlet opening being centrally disposed relative to said carrier for discharging said air flow out of said internal space.

2. The saddle seat type electric vehicle according to claim 1, wherein said plurality of cells are arranged adjacent to each other with given intervals on the same plane.

3. The saddle seat type electric vehicle according to claim 1, and further including a protective member provided between said secondary battery and an inner wall of said carrier and fixed to said carrier so as to surround said secondary battery.

4. An electric vehicle comprising:
a frame with a front wheel being operatively connected to a front portion of the frame and at least one drive wheel being operatively connected to a rear portion of the frame;
a motor for driving said drive wheel;
a secondary battery including a plurality of cells for supplying electric power to said motor;
a carrier operatively connected to the frame for carrying luggage;
a seat operatively connected to the frame for supporting an operator;
an internal space being formed in said carrier with said plurality of cells of the secondary battery being stored in said internal space of said carrier;
a radiator located on a side of said vehicle inclined downward to a front side of said vehicle for receiving air flow; and
a motor-driven fan mounted on said radiator capable of forcibly causing a flow of air, wherein said carrier has a drain opening for removing water from said carrier;
said carrier includes an air inlet opening for introducing an air flow into said internal space with at least one spacing formed between the plurality of cells of the secondary battery, so as to cool said secondary battery and an air outlet opening being centrally disposed relative to said carrier for discharging said air flow out of said internal space.

5. The electric vehicle according to claim 4, wherein said plurality of cells are arranged adjacent to each other with given intervals on the same plane.

6. The saddle seat type electric vehicle according to claim 4, and further including a protective member provided between said secondary battery and an inner wall of said carrier and fixed to said carrier so as to surround said secondary battery.

7. A saddle seat type electric vehicle comprising:
a drive wheel;
a motor for driving said drive wheel;
a secondary battery including a plurality of cells for supplying electric power to said motor;
a carrier for carrying luggage;
a seat for supporting an operator;
a radiator located on a side of said vehicle inclined downward to a front side of said vehicle for receiving air flow; and
a motor-driven fan mounted on said radiator capable of forcibly causing a flow of air,
wherein said carrier is formed like a box having an internal space and is located behind said seat and above a rear wheel,
said plurality of cells of the secondary battery being stored in said internal space of said carrier, and
said carrier includes an air inlet opening facing backwardly for introducing an air flow into said internal space with at least one spacing formed between the plurality of cells of the secondary battery, so as to cool said secondary battery and an air outlet opening being centrally disposed relative to said carrier for discharging said air flow out of said internal space.

8. The saddle seat type electric vehicle according to claim 7, wherein said plurality of cells are arranged adjacent to each other with given intervals on the same plane.

9. The saddle seat type electric vehicle according to claim 7, and further including a protective member provided between said secondary battery and an inner wall of said carrier and fixed to said carrier so as to surround said secondary battery.

* * * * *